US012568224B2

(12) United States Patent
　　Lim

(10) Patent No.:　US 12,568,224 B2
(45) Date of Patent:　Mar. 3, 2026

(54) EVC DECODING COMPLEXITY METRICS

(71) Applicant: Samsung Electronics Co., Ltd.,
　　Suwon-si (KR)

(72) Inventor: Youngkwon Lim, Allen, TX (US)

(73) Assignee: Samsung Electronics Co., Ltd.,
　　Suwon-si (KR)

( * ) Notice: Subject to any disclaimer, the term of this
patent is extended or adjusted under 35
U.S.C. 154(b) by 143 days.

(21) Appl. No.: 18/349,103

(22) Filed: Jul. 7, 2023

(65) Prior Publication Data

US 2024/0015301 A1　　Jan. 11, 2024

Related U.S. Application Data

(60) Provisional application No. 63/416,778, filed on Oct.
17, 2022, provisional application No. 63/359,942,
filed on Jul. 11, 2022.

(51) Int. Cl.
　H04N 11/02　　(2006.01)
　H04N 19/14　　(2014.01)
　H04N 19/18　　(2014.01)

(52) U.S. Cl.
　CPC ............. H04N 19/14 (2014.11); H04N 19/18
　　　　　　　　　　　　　　　　　(2014.11)

(58) Field of Classification Search
　CPC ............................... H04N 19/14; H04N 19/18
　USPC ...................................................... 375/240.02
　See application file for complete search history.

(56) References Cited

U.S. PATENT DOCUMENTS

| | | |
|---|---|---|
| 6,351,730 B2 | 2/2002 | Chen |
| 9,967,302 B2 | 5/2018 | Lim et al. |

| | | | |
|---|---|---|---|
| 10,448,035 B2 | 10/2019 | Moriyoshi | |
| 10,587,880 B2 | 3/2020 | Yu et al. | |
| 2011/0194613 A1* | 8/2011 | Chen .................... | H04N 19/176 |
| | | | 375/E7.2 |
| 2014/0136727 A1 | 5/2014 | Lim et al. | |
| 2022/0150544 A1* | 5/2022 | Deng ..................... | H04N 19/70 |
| 2022/0182642 A1 | 6/2022 | Fernandes | |
| 2022/0232224 A1* | 7/2022 | Xu ......................... | H04N 19/124 |
| 2022/0385910 A1* | 12/2022 | Lai .......................... | H04N 19/13 |

(Continued)

FOREIGN PATENT DOCUMENTS

| | | |
|---|---|---|
| CN | 103888762 A | 6/2014 |
| WO | 2022116113 A1 | 6/2022 |

OTHER PUBLICATIONS

"Information technology—MPEG systems technologies—Part 11:
Energy-efficient media consumption (green metadata)", ISO/IEC
FDIS 23001-11:2022(E), Nov. 2022, 90 pages.

(Continued)

*Primary Examiner* — Jayanti K Patel
*Assistant Examiner* — Richard B Carter

(57)　　　　　ABSTRACT

An apparatus includes a communication interface and a
processor operably coupled to the communication interface.
The processor is configured to receive, via the communica-
tion interface, a bitstream including complexity metrics
(CM) metadata. The processor is also configured to extract
information in the CM metadata from the bitstream, wherein
the information includes a direct indication of a number of
coding units (CUs) in the bitstream that have non-zero
transform coefficients, for each CU size of a plurality of CU
sizes. The processor is further configured to predict a
decoding complexity of the bitstream based on information
in the CM metadata.

20 Claims, 5 Drawing Sheets

500

(56)                 References Cited

U.S. PATENT DOCUMENTS

2023/0319265 A1     10/2023   Wang
2024/0121403 A1*    4/2024   Francois ............. H04N 19/176

OTHER PUBLICATIONS

International Search Report and Written Opinion issued Oct. 13, 2023 regarding International Application No. PCT/KR2023/009779, 10 pages.
MPEG Systems, "White paper on Essential Video Coding (EVC)," ISO/IEC JTC 1/SC 29/AG 3 N00046, Nov. 2021 , 17 pages.

* cited by examiner

500

START

502

RECEIVE A BITSTREAM INCLUDING COMPLEXITY METRICS (CM) METADATA

504

EXTRACT INFORMATION IN THE CM METADATA FROM THE BITSTREAM

506

PREDICT A DECODING COMPLEXITY OF THE BITSTREAM BASED ON THE CM METADATA

END

EVC DECODING COMPLEXITY METRICS

CROSS-REFERENCE TO RELATED APPLICATION AND PRIORITY CLAIM

This application claims priority under 35 U.S.C. § 119(e) to U.S. Provisional Patent Application No. 63/359,952 filed on Jul. 11, 2022 and U.S. Provisional Patent Application No. 63/416,778 filed on Oct. 17, 2022, which are hereby incorporated by reference in their entirety.

TECHNICAL FIELD

This disclosure relates generally to media devices and processes. More specifically, this disclosure relates to essential video coding (EVC) decoding complexity metrics.

BACKGROUND

EVC baseline and main profiles do not share many tools and use different methods for partitioning of the pictures. A length of syntax elements indicating a number of samples and coding units needs to be decided according to their largest value to minimize a size of the software engineering institute (SEI) message carrying the complexity metrics.

SUMMARY

This disclosure provides EVC decoding complexity metrics.

In a first embodiment, an apparatus includes a communication interface and a processor operably coupled to the communication interface. The processor is configured to receive, via the communication interface, a bitstream including complexity metrics (CM) metadata. The processor is also configured to extract information in the CM metadata from the bitstream, wherein the information includes a direct indication of a number of coding units (CUs) in the bitstream that have non-zero transform coefficients, for each CU size of a plurality of CU sizes. The processor is further configured to predict a decoding complexity of the bitstream based on information in the CM metadata.

In a second embodiment, a method includes receiving a bitstream including complexity metrics (CM) metadata. The method also includes extracting information in the CM metadata from the bitstream, wherein the information includes a direct indication of a number of coding units (CUs) in the bitstream that have non-zero transform coefficients, for each CU size of a plurality of CU sizes. The method further includes predicting a decoding complexity of the bitstream based on information in the CM metadata.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As discussed above, EVC baseline profile and main profile do not share many tools and use different methods for partitioning pictures. Therefore, a profile the concurrent version systems (CVS) conform to is used to decide the set of syntax elements to describe the complexity metrics to be applied to each CVS. A maximum number of pixels and coding units depends on a size of the picture a complexity metric is applied to. As a largest size of a picture is indicated by a level that the CVS is conformed to, a length of the syntax elements indicating the number of pixels and coding units is decided by the levels. In addition, width and height of the coding units are also considered when a length of the syntax elements indicating the number of coding units for the CVS conforming to the baseline profile as the width and height of the coding units get larger than the maximum number of coding units get smaller.

Figure 1:
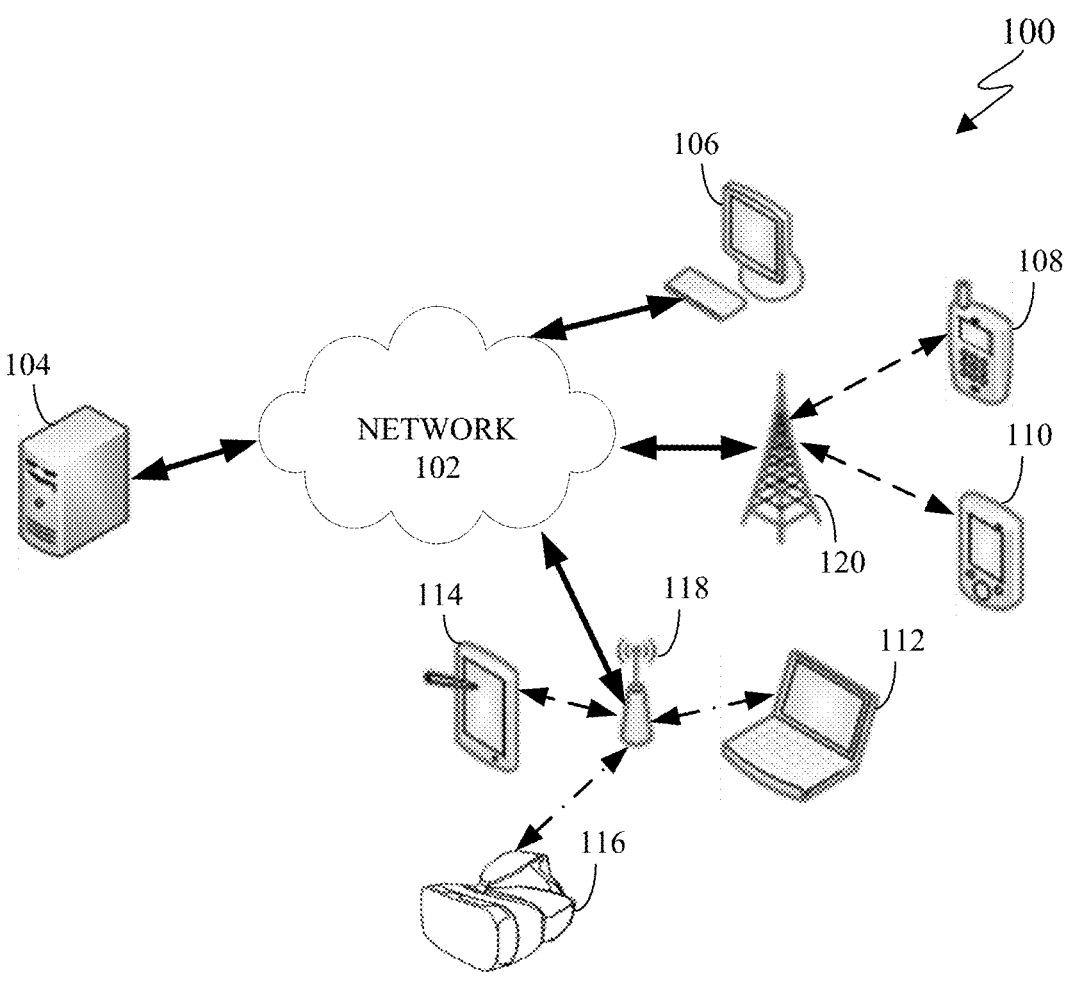
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can implement EVC decoding complexity metrics.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can then compress 3D point cloud or mesh to generate a bitstream and then transmit the bitstream to one or more of the client devices 106-116. For another example, one of the client devices 106-116 can compress a 3D point cloud or mesh to generate a bitstream and then transmit the bitstream to another one of the client devices 106-116 or to the server 104. In certain embodiments, the client devices 106-116 implement EVC decoding complexity metrics.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
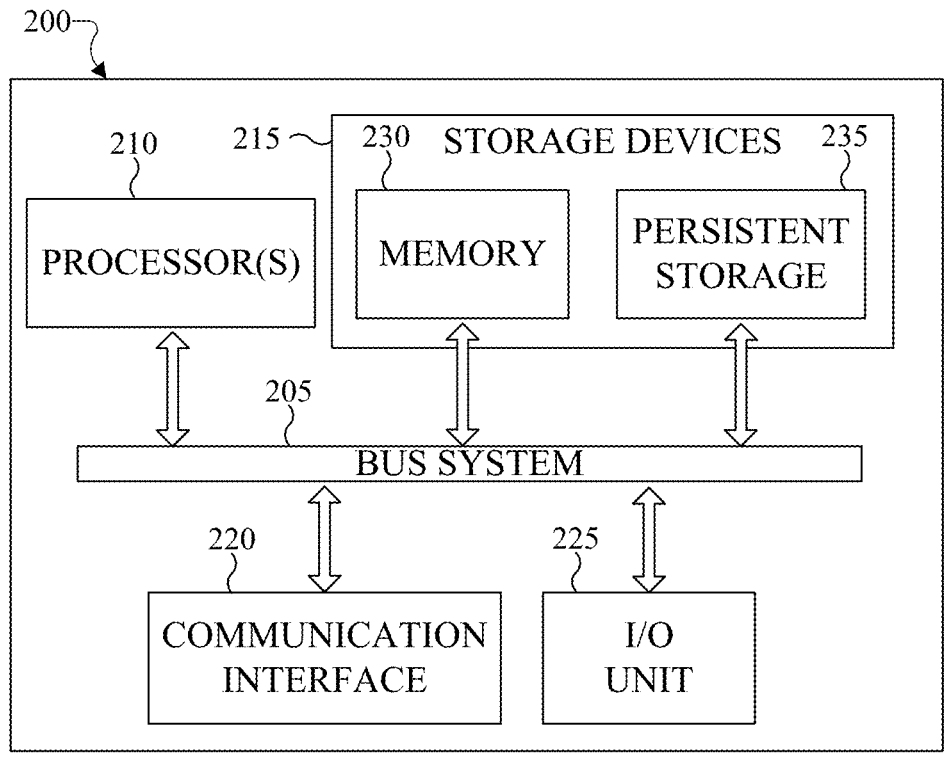
FIGS. 2 and 3 illustrate example electronic devices in accordance with an embodiment of this disclosure.
Figure 3:
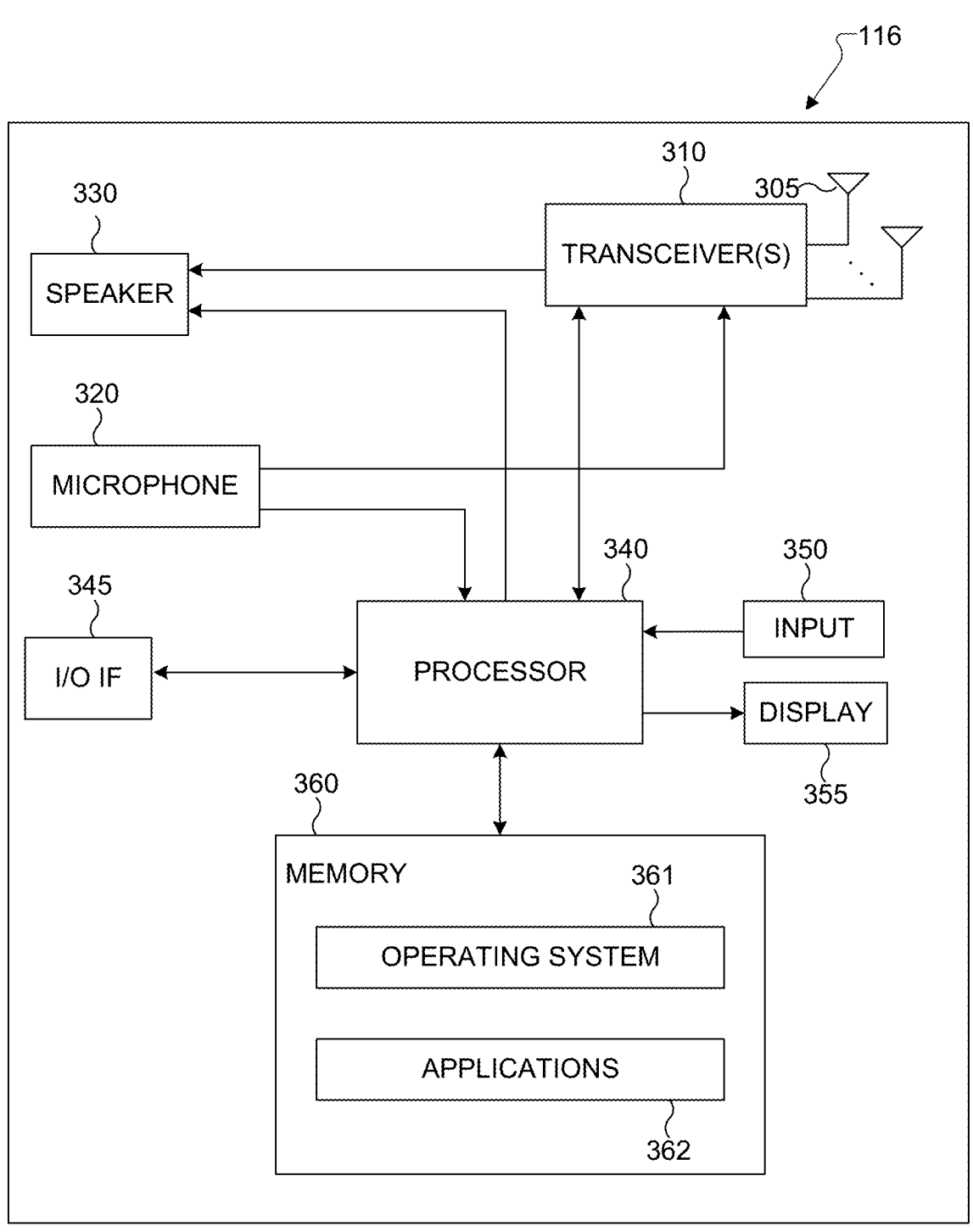

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding. In certain embodiments, the processor 210 can implement EVC decoding complexity metrics.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver, transmit (TX) processing circuitry, a microphone 320, and receive (RX) processing circuitry 325. The RF transceiver can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry receives analog or digital voice data from the microphone 320 or other outgoing baseband data from the processor 340. The outgoing baseband data can include web data, e-mail, or interactive video game data. The TX processing circuitry encodes, multiplexes, and/or digitizes the outgoing baseband data to generate a processed baseband or intermediate frequency signal. The RF transceiver receives the outgoing processed baseband or intermediate frequency signal from the TX processing circuitry and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can implement EVC decoding complexity metrics.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
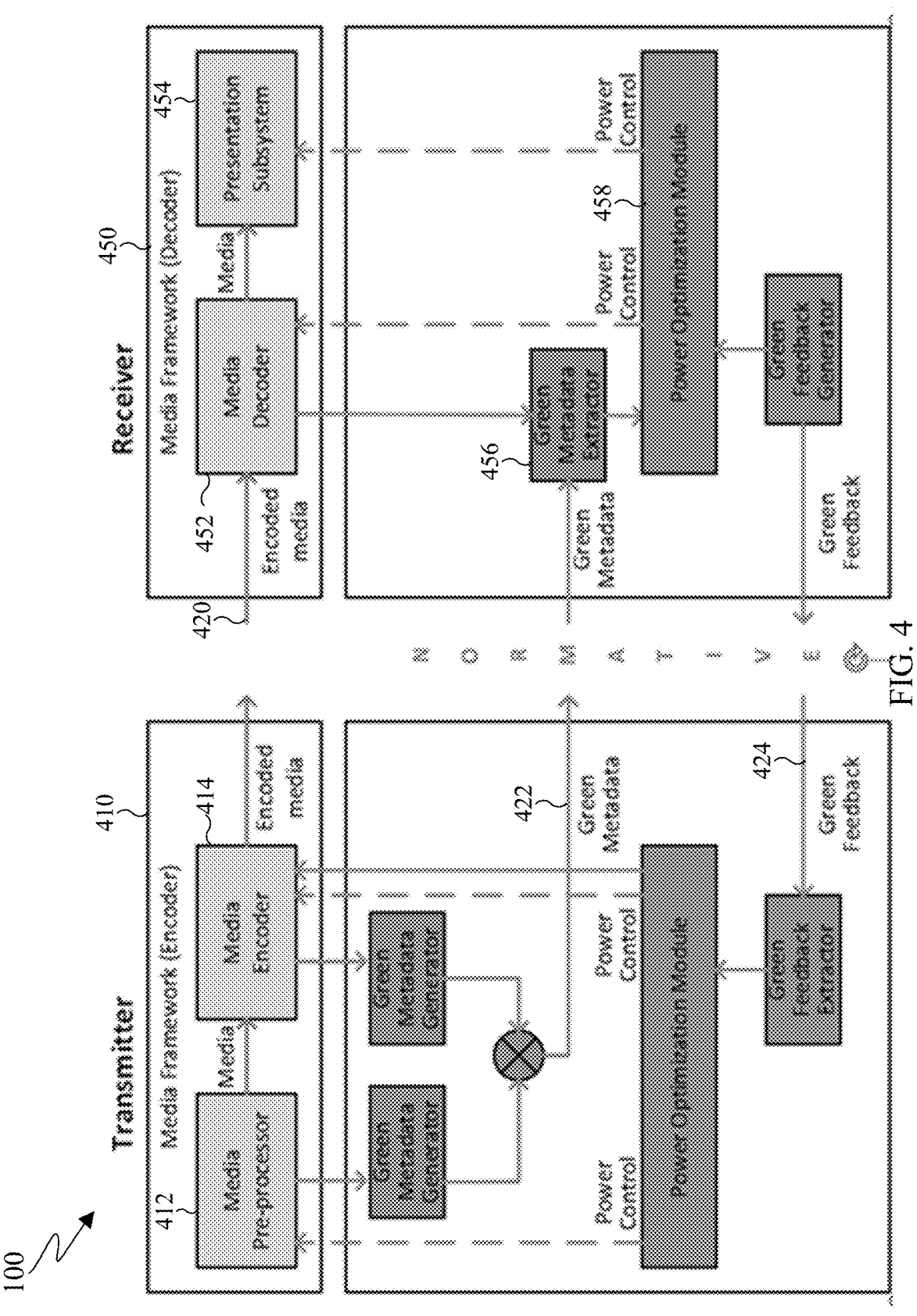
FIG. 4 illustrates a block diagram of an example environment-architecture in accordance with an embodiment of this disclosure.

FIG. 4 illustrates a block diagram of an example environment-architecture 400 for storage of EVC decoder configuration information in accordance with an embodiment of this disclosure. The embodiment of FIG. 4 is for illustration only. Other embodiments can be used without departing from the scope of this disclosure.

As shown in FIG. 4, the example environment-architecture 400 includes an encoder 410 and a decoder 450 in communication over a network.

In certain embodiments, the encoder 410 and the decoder 450 can represent the server 104, one of the client devices 106-116 of FIG. 1, or another suitable device. The encoder 410 and the decoder 450 can include internal components similar to the server 200 of FIG. 2 and electronic device 300 of FIG. 3. In certain embodiments, the encoder 410 and the decoder 450 can be a "cloud" of computers interconnected by one or more networks, where each is a computing system utilizing clustered computers and components to act as a single pool of seamless resources when accessed through a network. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

The encoder 410 receives media content from another device such as a server (similar to the server 104 of FIG. 1, the server 200 of FIG. 2) or an information repository (such and presentation. At the decoder 450, the metadata extractor 456 processes the packets and sends the green metadata 422 to a power optimization module 458 for efficient power control. For instance, the power optimization module 458 can interpret the green metadata 422 and then can apply appropriate operations to reduce a power consumption of the media decoder 452 when decoding the video and also to reduce a power consumption of the presentation subsystem 454 when rendering the video. In addition, the power-optimization module 458 can collect receiver information, such as remaining battery capacity, and send it to the encoder 410 as green feedback 424 to adapt the encoder operations for power-consumption reduction. A EVC decoder may use complexity metrics (CM) metadata to predict a decoding complexity of the bitstream 420 based on vary operating frequency or voltage and thus adjust decoder power consumption. The syntax for the EVC CMs is shown in Table 1.

TABLE 1

|  | Descriptor |
|---|---|
| period_type | u(8) |
| if (period_type == 0 ‖ period_type == 2 ‖ period_type == 4) { |  |
|   num_non_zero_4_cus | u(16) |
|   num_non_zero_8_cus | u(16) |
|   num_non_zero_16_cus | u(16) |
|   num_non_zero_32_cus | u(16) |
|   num_non_zero_64_cus | u(16) |
|   portion_fractional_prediction_sample | u(8) |
| } else if (period_type = = 1 ‖ period_type == 3 ‖ period_type == 5) |  |
| { |  |
|   num_count | u(16) |
|   for (t = 0; t<num_count; t++ ) { |  |
|     portion_non_zero_4_cus [t] | u(16) |
|     portion_non_zero_8_cus [t] | u(16) |
|     portion_non_zero_16_cus [t] | u(16) |
|     portion_non_zero_32_cus [t] | u(16) |
|     portion_non_zero_64_cus [t] | u(16) |
|     portion_fractional_prediction_sample [t] | u(8) |
|   } |  |
| } |  | as a database). The encoder 410 transmits frames representing the media content as an encoded bitstream. The bitstream 420 can be transmitted to an information repository (such as a database) or an electronic device that includes a decoder (such as the decoder 450), or the decoder 450 itself.

The decoder 450 can receive a bitstream that represents media content. The bitstreams can include data representing EVC decoder configuration information. In certain embodiments, the decoder 450 can decode the bitstream that includes the multiple frames and auxiliary information that are used when reconstructing the media content. The EVC decoder configuration information can be associated with green metadata 422.

The media pre-processor 412 can analyze and filter a content source and a media encoder 414 can encode content to a bitstream 420 for delivery. The bitstream 420 is delivered to the decoder 450 and decoded by a media decoder 452 with the output rendered on a presentation subsystem 454 that implements a display process.

The green metadata 422 is extracted from either the media encoder 414 or the media pre-processor 412. In both cases, the green metadata 422 is multiplexed or encapsulated in the conformant bitstream 420. Such green metadata 422 is used at the decoder 450 to reduce the power consumption for video decoding and presentation. The bitstream 420 can be packetized and delivered to the decoder 450 for decoding The semantics of EVC CMs are defined below. A period type variable specifies a type of upcoming period over which the complexity metrics are applicable and is defined in Table 2.

TABLE 2

| Value | Description |
|---|---|
| 0x0 | complexity metrics are applicable to a single picture |
| 0x1 | complexity metrics are applicable over a specified number of pictures counted in decoding order |
| 0x2 | complexity metrics are applicable to a single slice |
| 0x3 | complexity metrics are applicable to a specified number of slices counted in decoding order |
| 0x4 | complexity metrics are applicable to a single NAL unit |
| 0x5 | complexity metrics are applicable to a specified number of NAL units counted in receiving order |
| 0x6-0xF | user-defined |

A num_non_zero_4_cus field indicates a number of coding units whose width and height are 4 samples and have non-zero transform coefficients values in the period complexity metrics is applied. A num_non_zero_8_cus field indicates the number of coding units whose width and height are 8 samples and have non-zero transform coefficients values in the period complexity metrics is applied. A num_non_zero_16_cus field indicates the number of coding units whose width and height are 16 samples and have non-zero transform coefficients values in the period complexity metrics is applied. A num_non_zero_32_cus field indicates the number of coding units whose width and height are 32 samples and have non-zero transform coefficients values in the period complexity metrics is applied. A num_non_zero_64_cus field indicates the number of coding units whose width and height are 32 samples and have non-zero transform coefficients values in the period complexity metrics is applied. A portion_fractional_prediction_sample field indicates the portion of the samples requires fractional sample interpolation process applied in the period complexity metrics is applied. It is defined as follows:

portion_fractional_prediction_sample =

$$\mathrm{Floor}\left(\frac{\text{number of samples requiring fractional}}{\text{sample interpolation process}} * 255\right) \quad (1)$$

A num_count field indicates the number of pictures, slices or NAL units over which the complexity metrics is applicable when period_type is 1, 3, or 5. When period_type is 1, then num_count indicates the number of pictures in decoding order. When period_type is 3, then num_count indicates the number of slices in decoding order. When period_type is 5, then num_count indicates the number of NAL unites in receiving order.

A num_non_zero_4_cus [t] field indicates the number of coding units whose width and height are 4 samples and have non-zero transform coefficients values in the period $(t+1)^{th}$ complexity metrics is applied. When period_type is 1, the period this metrics applied is $t^{th}$ picture in decoding order. When period_type is 3, the period this metrics applied is $t^{th}$ slice in decoding order. When period_type is 5, the period this metrics applied is $t^{th}$ NAL unit in receiving order.

A num_non_zero_8_cus [t] field indicates the number of coding units whose width and height are 8 samples and have non-zero transform coefficients values in the period $(t+1)^{th}$ complexity metrics is applied. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_non_zero_16_cus [t] field indicates the number of coding units whose width and height are 16 samples and have non-zero transform coefficients values in the period $(t+1)^{th}$ complexity metrics is applied. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_non_zero_32_cus [t] field indicates the number of coding units whose width and height are 32 samples and have non-zero transform coefficients values in the period (t+1) th complexity metrics is applied. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_non_zero_64_cus [t] indicates the number of coding units whose width and height are 64 samples and have non-zero transform coefficients values in the period $(t+1)^{th}$ complexity metrics is applied. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A portion_fractional_prediction_sample [t] field indicates the portion of the samples requires fractional sample interpolation process applied in the period $(t+1)^{th}$ complexity metrics is applied. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order. The syntax for the EVC CMs can also be expressed as shown in Table 3.

TABLE 3

| | |
|---|---|
| period_type | u(8) |
| if (profile_idc == 0) { | |
|   if (period_type == 0 ‖ period_type == 2 ‖ period_type == 4) | |
|   { | |
|     num_non_zero_4_cus | uk(v) |
|     num_non_zero_8_cus | uk(v) |
|     num_non_zero_16_cus | uk(v) |
|     num_non_zero_32_cus | uk(v) |
|     num_non_zero_64_cus | uk(v) |
|     portion_fractional_prediction_sample | u(8) |
|   } else if (period_type = 1 ‖ period_type = 3 ‖ period_type = 5) { | |
|     num_count | u(16) |
|     for (t=0; t<num_count; t++ ) { | |
|       num_non_zero_4_cus [t] | uk(v) |
|       num _non_zero_8_cus [t] | uk(v) |
|       num _non_zero_16_cus [t] | uk(v) |
|       num _non_zero_32_cus [t] | uk(v) |
|       num _non_zero_64_cus [t] | uk(v) |
|       portion_fractional_prediction_sample [t] | u(8) |
|     } | |
|   } | |
| } | |
| else if (profile_idc == 1) { | |
|   if (period_type == 0 ‖ period_type == 2 ‖ period_type == 4) | |
|   { | |
|     num_non_zero_samples | uk(v) |
|     num_amvr_samples | uk(v) |
|     num_dmvr_samples | uk(v) |
|     num_alf_samples | uk(v) |
|     num_deblocking_filter_samples | uk(v) |
|     num_htdf_samples | uk(v) |
|   } else if (period_type == 1 ‖ period_type == 3 ‖ period_type = 5) { | |
|     num_count | u(8) |
|     for (t = 0; t < num_count; t++ ) { | |
|       num_non_zero_samples [t] | uk(v) |
|       num_amvr_samples [t] | uk(v) |
|       num_dmvr_samples [t] | uk(v) |
|       num_alf_samples [t] | uk(v) |
|       num_deblocking_filter_samples [t] | uk(v) |
|       num_htdf_samples [t] | uk(v) |
|     } | |
|   } | |

The maximum number of pixels and coding units depend on the size of the picture the complexity metric is applied to. As the largest size of picture is indicated by the level the CVS is conformed to the length of the syntax elements indicating the number of pixels and coding units are decided by the levels. In addition, the width and height of the coding units are also considered when the length of the syntax elements indicating the number of coding units for the CVS conforming to the baseline profile as the width and height of the coding units get larger than the maximum number of coding units get smaller.

A—uk(v) field is unsigned integer and the length is decided by the value of the level_idc field in the SPS used by the CVS this SEI message is applied to and the value of k assigned to each field based on the size of the units counted. The length of the field according to each value of both level_idc and k is shown in the Table 4.

TABLE 4

| value of level_ | | length of the field | | | | |
|---|---|---|---|---|---|---|
| level | idc | k = 1 | k = 4 | k = 8 | k = 16 | k = 32 | k = 64 |
| 1 | 30 | 16 | 16 | 16 | 8 | 8 | 8 |
| 2 | 60 | 24 | 16 | 16 | 16 | 8 | 8 |
| 2.1 | 63 | 24 | 16 | 16 | 16 | 8 | 8 |
| 3 | 90 | 24 | 16 | 16 | 16 | 16 | 8 |
| 3.1 | 93 | 24 | 16 | 16 | 16 | 16 | 8 |
| 4 | 120 | 24 | 24 | 16 | 16 | 16 | 16 |
| 4.1 | 123 | 24 | 24 | 16 | 16 | 16 | 16 |
| 5 | 150 | 24 | 24 | 24 | 16 | 16 | 16 |
| 5.1 | 153 | 24 | 24 | 24 | 16 | 16 | 16 |
| 5.2 | 156 | 24 | 24 | 24 | 16 | 16 | 16 |
| 6 | 180 | 32 | 24 | 24 | 24 | 16 | 16 |
| 6.1 | 183 | 32 | 24 | 24 | 24 | 16 | 16 |
| 6.2 | 186 | 32 | 24 | 24 | 24 | 16 | 16 |

A profile_idc field indicates the profile of the CVS this SEI message is associated with.

A period_type field specifies the type of upcoming period over which the complexity metrics are applicable and is defined in the Table 5.

TABLE 5

| Value | Description |
|---|---|
| 0x0 | complexity metrics are applicable to a single picture |
| 0x1 | complexity metrics are applicable over a specified number of pictures counted in decoding order |
| 0x2 | complexity metrics are applicable to a single slice |
| 0x3 | complexity metrics are applicable to a specified number of slices counted in decoding order |
| 0x4 | complexity metrics are applicable to a single NAL unit |
| 0x5 | complexity metrics are applicable to a specified number of NAL units counted in receiving order |
| 0x6-0xF | user-defined |

A num_non_zero_4_cus field indicates the number of coding units whose width and height are not greater than 4 samples and have non-zero transform coefficients values in the period complexity metrics is applied to. The length of this field is decided by the value of the level_idc field in the SPS used by the CVS the SEI message this field is applied to and the value of the k is equal to 4.

A num_non_zero_8_cus field indicates the number of coding units whose width and height are 8 samples and have non-zero transform coefficients values in the period complexity metrics is applied to. The length of this field is decided by the value of the level_idc field in the SPS used by the CVS the SEI message this field is applied to and the value of the k is equal to 8.

A num_non_zero_16_cus field indicates the number of coding units whose width and height are 16 samples and have non-zero transform coefficients values in the period complexity metrics is applied to. The length of this field is decided by the value of the level_idc field in the SPS used by the CVS the SEI message this field is applied to and the value of the k is equal to 16.

A num_non_zero_32_cus field indicates the number of coding units whose width and height are 32 samples and have non-zero transform coefficients values in the period complexity metrics is applied to. The length of this field is decided by the value of the level_idc field in the SPS used by the CVS the SEI message this field applied to and the value of the k is equal to 32.

A num_non_zero_64_cus field indicates the number of coding units whose width and height are 32 samples and have non-zero transform coefficients values in the period complexity metrics is applied to. The length of this field is decided by the value of the level_idc field in the SPS used by the CVS the SEI message this field is applied to and the value of the k is equal to 64.

A portion_fractional_prediction_sample field indicates the portion of the samples requires fractional sample interpolation process applied in the period complexity metrics is applied to. It is defined as follows:

$$\text{portion\_fractional\_prediction\_sample} = \text{Floor}\left(\frac{\text{number of samples requiring fractional sample interpolation process}}{\text{total number of samples in the period}} * 255\right)(0\text{-}1) \tag{2}$$

A num_count field indicates the number of pictures, slices or NAL units over which the complexity metrics is applicable when period_type is 1, 3, or 5. When period_type is 1, then num_count indicates the number of pictures in decoding order. When period_type is 3, then num_count indicates the number of slices in decoding order. When period_type is 5, then num_count indicates the number of NAL unites in receiving order.

A num_non_zero_4_cus [t] field indicates the number of coding units whose width and height are not greater than 4 samples and have non-zero transform coefficients values in the period $(t+1)^{th}$ complexity metrics is applied to. The length of this field is decided by the value of the level_idc field in the SPS used by the CVS the SEI message this field is applied to with and the value of the k is equal to 4. When period_type is 1, the period this metrics applied is $t^{th}$ picture in decoding order. When period_type is 3, the period this metrics applied is $t^{th}$ slice in decoding order. When period_type is 5, the period this metrics applied is $t^{th}$ NAL unit in receiving order.

A num_non_zero_8_cus [t] field indicates the number of coding units whose width and height are 8 samples and have non-zero transform coefficients values in the period $(t+1)^{th}$ complexity metrics is applied to. The length of this field is decided by the value of the level_idc field in the SPS used by the CVS the SEI message this field is applied to and the value of the k is equal to 8. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_non_zero_16_cus [t] field indicates the number of coding units whose width and height are 16 samples and have non-zero transform coefficients values in the period $(t+1)^{th}$ complexity metrics is applied to. The length of this field is decided by the value of the level_idc field in the SPS used by the CVS the SEI message this field is applied to with and the value of the k is equal to 16. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_non_zero_32_cus [t] field indicates the number of coding units whose width and height are 32 samples and have non-zero transform coefficients values in the period $(t+1)^{th}$complexity metrics is applied to. The length of this field is decided by the value of the level_idc field in the SPS used by the CVS the SEI message this field is applied to and the value of the k is equal to 32. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_non_zero_64_cus [t] field indicates the number of coding units whose width and height are 64 samples and have non-zero transform coefficients values in the period $(t+1)^{th}$ complexity metrics is applied to. The length of this field is decided by the value of the level_idc field in the SPS used by the CVS the SEI message this field is applied to and the value of the k is equal to 464. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A portion_fractional_prediction_sample [t] field indicates the portion of the samples requires fractional sample interpolation process applied to in the period $(t+1)^{th}$ complexity metrics is applied. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_non_zero_samples field indicates the number of non-zero transform coefficients in the period complexity metrics is applied to. The length of this field is decided by the value of the level_idc field in the SPS applied the CVS the SEI message this field is associated with and the value of the k is equal to 1.

A num_affine_samples field indicates the number of pixels affine model based motion compensation is applied to in the period complexity metrics is applied to. The length of this field is decided by the value of the level_idc field in the SPS applied the CVS the SEI message this field is associated with, and the value of the k is equal to 1.

A num_dmvr_samples field indicates the number of pixels decoder-side motion vector refinement is applied to in the period complexity metrics is applied to. The length of this field is decided by the value of the level_idc field in the SPS applied the CVS the SEI message this field is associated with, and the value of the k is equal to 1.

A num_alf samples field indicates the number of pixels adaptive loop filter is applied to in the period complexity metrics is applied to. The length of this field is decided by the value of the level_idc field in the SPS applied the CVS the SEI message this field is associated with, and the value of the k is equal to 1.

A num_deblocking_filter_samples field indicates the number of pixels deblocking filter is applied to in the period complexity metrics is applied to. The length of this field is decided by the value of the level_idc field in the SPS applied the CVS the SEI message this field is associated with, and the value of the k is equal to 1.

A num_htdf_samples field indicates the number of pixels hadamard transform domain filter is applied to in the period complexity metrics is applied to. The length of this field is decided by the value of the level_idc field in the SPS applied the CVS the SEI message this field is associated with, and the value of the k is equal to 1.

A num_non_zero_samples [t] field indicates the number of non-zero transform coefficients in the period $(t+1)^{th}$ complexity metrics is applied to. The length of this field is decided by the value of the level_idc field in the SPS used by the CVS the SEI message this field is applied to and the value of the k is equal to 1. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_affine_samples [t] field indicates the number of pixels affine model based motion compensation is applied to in the period $(t+1)^{th}$ complexity metrics is applied to. The length of this field is decided by the value of the level_idc field in the SPS used by the CVS the SEI message this field is applied to and the value of the k is equal to 1. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_dmvr_samples [t] field indicates the number of pixels decoder-side motion vector refinement is applied to in the period $(t+1)^{th}$ complexity metrics is applied to. The length of this field is decided by the value of the level_idc field in the SPS used by the CVS the SEI message this field is applied to and the value of the k is equal to 1. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_alf_samples [t] field indicates the number of pixels adaptive loop filter is applied to in the period $(t+1)^{th}$ complexity metrics is applied to. The length of this field is decided by the value of the level_idc field in the SPS used by the CVS the SEI message this field is applied to and the value of the k is equal to 1. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_deblocking_filter_samples [t] field indicates the number of pixels deblocking filter is applied to in the period $(t+1)^{th}$ complexity metrics is applied to. The length of this field is decided by the value of the level_idc field in the SPS used by the CVS the SEI message this field is applied to and the value of the k is equal to 1. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

A num_htdf_samples [t] field indicates the number of pixels Hadamard transform domain filter is applied to in the period $(t+1)^{th}$ complexity metrics is applied to. The length of this field is decided by the value of the level_idc field in the SPS used by the CVS the SEI message this field is applied to and the value of the k is equal to 1. When period_type is 1, the period this metrics applied is $(t+1)^{th}$ picture in decoding order. When period_type is 3, the period this metrics applied is $(t+1)^{th}$ slice in decoding order. When period_type is 5, the period this metrics applied is $(t+1)^{th}$ NAL unit in receiving order.

Although FIG. 4 illustrates examples of an encoder and a decoder, various changes can be made to FIG. 4. For example, various components in FIG. 4 could be combined, further subdivided, or omitted and additional components could be added according to particular needs. As a particular example, the encoder 410 or decoder 450 could be divided into multiple components. In addition, as with computing and communication, encoders and decoders can come in a wide variety of configurations, and FIG. 4 does not limit this disclosure to any particular encoder or decoder.

Figure 5:
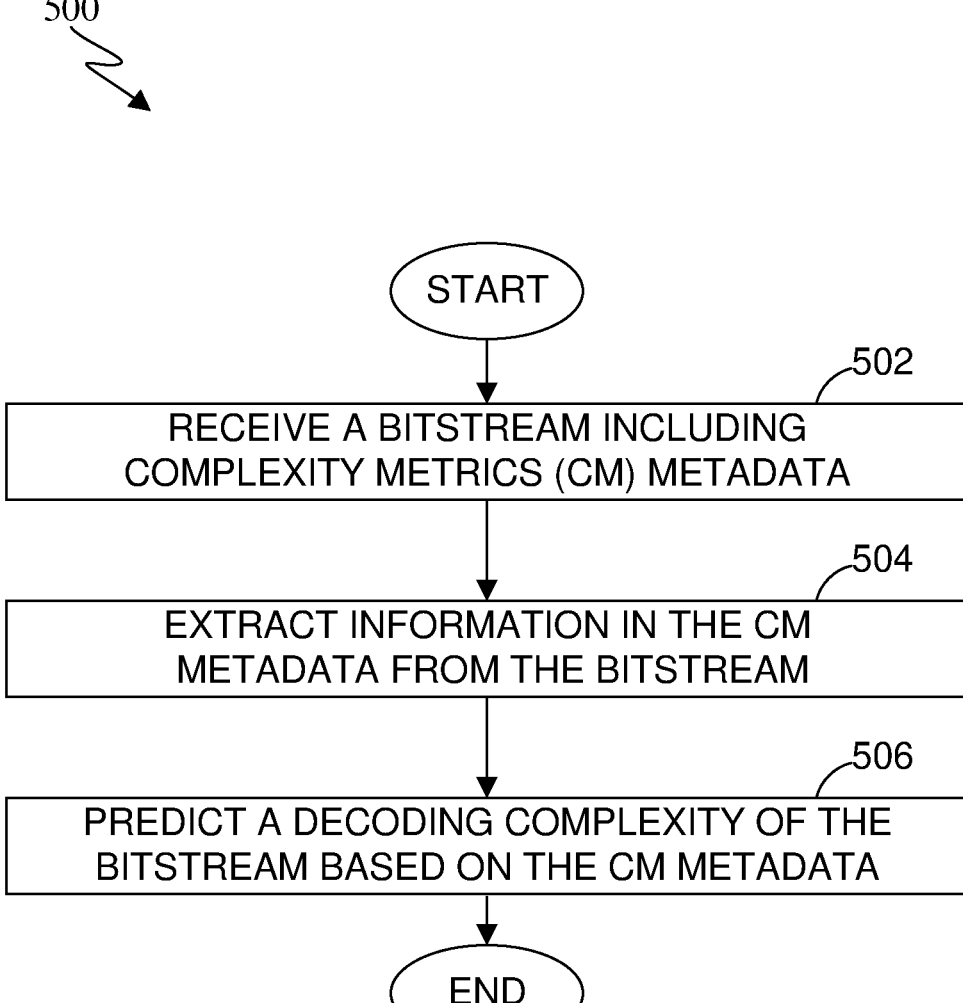
FIG. 5 illustrates an example method for an EVC decoding complexity metrics according to this disclosure.

FIG. 5 illustrates an example method 500 for EVC decoding complexity metrics according to this disclosure. For ease of explanation, the method 500 of FIG. 5 is described as being performed using the electronic device 101 of FIG. 1. However, the method 500 may be used with any other suitable system and any other suitable electronic device.

As shown in FIG. 5, the electronic device 101 can receive a bitstream including complexity metrics metadata at step 502. The CM metadata can include a number on non-zero coding units, a number of pixels in which an affine model based motion compensation is applied, a number of pixels in which a decoder-side motion vector refinement is applied, includes a number of pixels in which an adaptive loop filter is applied, a number of pixels in which a deblocking filter is applied, and a number of pixels in which a Hadamard transform domain filter is applied.

The electronic device can extract information in the complexity metrics metadata from the bitstream at step 504. The information can include a direct indication of a number of coding units in the bitstream that have non-zero transform coefficients, for each coding units size of a plurality of coding unit sizes. The direct indication for each CU size can be included in respective fields that vary in length based on the CU size and a level indicated in a sequence parameter set. For a given level indicated in the sequence parameter set, the length of the field for a smaller CU size is greater than the length of the field for a larger CU size. For a given CU size, the length of the field for a lower level is greater than the length of the field for a higher level.

The electronic device can predict a decoding complexity of the bitstream based on the cm metadata at step 506. The prediction of the coding complexity can be based on varying operating frequency or varying voltage. The prediction of the coding complexity can be used to adjust decoder power consumption.

Although FIG. 5 illustrates one example of a method 500 for EVC decoding complexity metrics, various changes may be made to FIG. 5. For example, while shown as a series of steps, various steps in FIG. 5 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
a communication interface; and
a processor operably coupled to the communication interface, the processor configured to:
  receive, via the communication interface, a bitstream including complexity metrics (CM) metadata;
  extract information in the CM metadata from the bitstream, wherein the information includes a value for a number of coding units (CUs) in the bitstream that have non-zero transform coefficients, for each CU size of a plurality of CU sizes; and
  predict a decoding complexity of the bitstream based on information in the CM metadata,
wherein each value of the number of CUs for each CU size is stored in a respective field of the CM metadata,
wherein each respective field of the CM metadata varies in length based on both the CU size and a level value, and
wherein the level value is indicated by a level indicator field in a sequence parameter set.

2. The apparatus of claim 1, wherein, for a given level value indicated by the level indicator field in the sequence parameter set, the length of the respective field for a smaller CU size is greater than the length of the respective field for a larger CU size.

3. The apparatus of claim 1, wherein, for a given CU size, the length of the respective field for a lower level is greater than the length of the respective field for a higher level.

4. The apparatus of claim 3, wherein the CM metadata includes a ratio of fractional prediction samples.

5. The apparatus of claim 1, wherein the CM metadata includes a number on non-zero coding units.

6. The apparatus of claim 1, wherein the CM metadata includes a number of pixels in which an affine model based motion compensation is applied.

7. The apparatus of claim 1, wherein the CM metadata includes a number of pixels in which a decoder-side motion vector refinement is applied.

8. The apparatus of claim 1, wherein the CM metadata includes a number of pixels in which an adaptive loop filter is applied.

9. The apparatus of claim 1, wherein the CM metadata includes a number of pixels in which a deblocking filter is applied.

10. The apparatus of claim 1, wherein the CM metadata includes a number of pixels in which a Hadamard transform domain filter is applied.

11. A method comprising:
receiving a bitstream including complexity metrics (CM) metadata;
extracting information in the CM metadata from the bitstream, wherein the information includes a value for a number of coding units (CUs) in the bitstream that have non-zero transform coefficients, for each CU size of a plurality of CU sizes; and
predicting a decoding complexity of the bitstream based on information in the CM metadata,
wherein each value of the number of CUs for each CU size is stored in a respective field of the CM metadata,
wherein each respective field of the CM metadata varies in length based on both the CU size and a level value, and
wherein the level value is indicated by a level indicator field in a sequence parameter set.

12. The method of claim 11, wherein, for a given level value indicated by the level indicator field in the sequence parameter set, the length of the respective field for a smaller CU size is greater than the length of the respective field for a larger CU size.

13. The method of claim 11, wherein, for a given CU size, the length of the respective field for a lower level is greater than the length of the respective field for a higher level.

14. The method of claim 13, wherein the CM metadata includes a ratio of fractional prediction samples.

15. The method of claim 11, wherein the CM metadata includes a number on non-zero coding units.

16. The method of claim 11, wherein the CM metadata includes a number of pixels in which an affine model based motion compensation is applied.

17. The method of claim 11, wherein the CM metadata includes a number of pixels in which a decoder-side motion vector refinement is applied.

18. The method of claim 11, wherein the CM metadata includes a number of pixels in which an adaptive loop filter is applied.

19. The method of claim 11, wherein the CM metadata includes a number of pixels in which a deblocking filter is applied.

20. The method of claim 11, wherein the CM metadata includes a number of pixels in which a Hadamard transform domain filter is applied.

\* \* \* \* \*